No. 880,707. PATENTED MAR. 3, 1908.
J. W. AYLSWORTH.
COMPOSITION FOR MAKING DUPLICATE PHONOGRAPH RECORDS.
APPLICATION FILED FEB. 5, 1906.
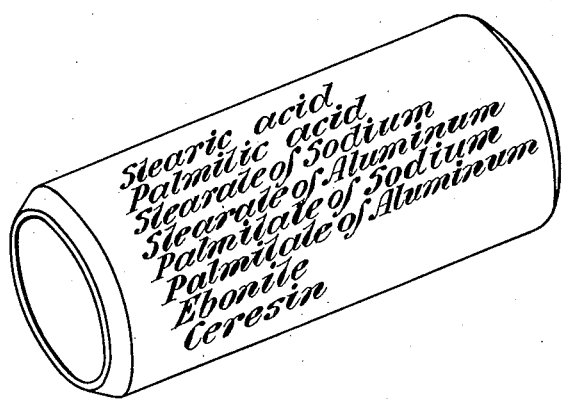
Witnesses:
Frank D. Lewis
Delos Holden
Inventor:
Jonas W. Aylsworth
by Frank L. Dyer
Atty.

UNITED STATES PATENT OFFICE.

JONAS W. AYLSWORTH, OF EAST ORANGE, NEW JERSEY, ASSIGNOR TO NEW JERSEY PATENT COMPANY, OF WEST ORANGE, NEW JERSEY, A CORPORATION OF NEW JERSEY.

COMPOSITION FOR MAKING DUPLICATE PHONOGRAPH-RECORDS.

No. 880,707.   Specification of Letters Patent.   Patented March 3, 1908.

Application filed February 5, 1906. Serial No. 299,630.

*To all whom it may concern:*

Be it known that I, JONAS W. AYLSWORTH, a citizen of the United States, and a resident of East Orange, in the county of Essex and State of New Jersey, have invented a certain new and useful Composition for Making Duplicate Phonograph-Records, of which the following is a specification.

In my Patent No. 782,375, of February 14, 1905, I describe an improved composition for making phonograph records, in which a hard wax such as carnauba is added to the usual stearates of soda and alumina for the purpose of making a hard composition having the desirable properties pointed out for use in this particular art, a non-hygroscopic ingredient, such as ceresin, being also preferably added and a black pigment being employed to give to the resulting composition a dark color. The supply of carnauba wax is relatively limited, and the demand created for the same in this art has been so great as to make the price objectionably high. In my search for a suitable ingredient that could be used in these compositions to replace the carnauba wax, I have discovered a material which is suitable for this purpose.

Two species of the material in question are articles of commerce which are on sale in the United States by the Strohmeyer & Arpe Company, 64 Pearl street, borough of Manhattan, New York city, under the trade names of "ebonite" and "montan wax" respectively. The former species is a waxlike substance which is blacker and harder than ozocerite. The latter species is also a wax-like substance and is of a dark yellowish brown, somewhat resembling discolored carnauba wax. These substances, as I am informed and believe, are extracted from certain kinds of bituminous brown coal, by a certain process of distillation or solution, the full details of which are not known to me as they are kept as trade secrets by the manufacturers. I do know, however, that the substances in question can be obtained from certain kinds of bituminous brown coal according to the process of United States Patent No. 689,381, dated December 24, 1901. The product which is obtained after driving off the benzin or benzene and which is described in lines 44 to 47 page 1, of the patent, is the same substance as the article known in commerce as "montan wax." If this substance be now distilled with steam as described in the patent, a wax-like material is distilled off leaving a residue. The patentee describes the distillation as being continued until this residue is coked. It is not necessary, however, to carry the distillation to this point, but on the other hand the distillation may be stopped while the residue is in the form of a black wax-like substance. Such a residue is the same substance as that which I have referred to as "ebonite."

Both ebonite and montan wax are cheaper than carnauba and produce equally desirable compositions. In addition they possess advantages by which they are actually superior to carnauba wax. In the first place they are both less affected by moisture than carnauba wax. They have fewer products of decomposition, so that less opportunity is offered for forming gas bubbles and in consequence it becomes possible to turn out a higher percentage of records and the latter are of superior appearance. Furthermore, when ebonite is used, the use of a black pigment, such as lamp black, is unnecessary, since the ebonite renders the composition black. This is an important practical advantage, since when lamp black is used it settles in the kettles and becomes unevenly distributed, so that the resulting records are not uniform, and furthermore, its presence on the surface of the records results in undue wear on the reproducing stylus. A record formed of a composition employing ebonite is, therefore, distinguished from those made of my previous composition in the respect that its entire mass can be brought to a molten condition by the application of heat, whereas with the previous composition, even when the bulk is in a melted state, the fine lamp black particles are unaffected. Although ebonite and montan wax are not quite so hard as carnauba wax, this fact is actually an advantage, since a larger percentage of these substances may be employed, which is desirable owing to their low cost.

In forming a composition suitable for the manufacture of phonograph records containing the material in question, I proceed along the lines described in my said patent. I have obtained excellent results by the use of the following formulas:—

(1) To 100 lbs. of stearic acid add 41.9 lbs. of ebonite and 7.377 lbs. of ceresin and melt the same in a suitable iron caldron or other vessel at a temperature of about 240 degrees Fahr. The stearic acid is the commercial article which, as is known, is a mixture of stearic and palmitic acids, although either of these acids could be used alone if it could be obtained. The stearic acid used melts at about 136 degrees Fahr. Care should be taken to see that the stearic acid is substantially free from oleic acid, as well as from mineral acids, salts, glycerin, and undecomposed fats, as tallow, &c. It should also be free from mucilaginous substances. When the stearic acid is fully melted, I add to the same a water solution obtained by dissolving in four gallons of water contained in a suitable steam-jacketed caldron, 22.6 lbs. of sal-soda, 474.74 grams of caustic soda of the best commercial grade, and 183.72 grams of metallic aluminium, preferably small pieces of thin sheet aluminium. When all the metal is dissolved, the solution is filtered while still hot in a filter-press or in any other way. In adding the alkaline solution to the melted stearic acid I gradually raise the temperature of the latter so as to correspond to the increased melting point of the mixture. The alkaline solution is added as rapidly as possible without unduly running the temperature down or causing excessive boiling or foaming. The solution can be added quite rapidly at first but toward the end it must be added very slowly. The addition of the alkaline solution to the stearic acid results in the production of stearates and palmitates of soda and of aluminium which are metallic soaps or metallic salts of fatty acids. During the saponification which thus takes place water and carbon dioxid are driven off. At the end of the operation the temperature will have gradually run up to about 360 degrees Fahr. The temperature of the mass is then raised to about 450 degrees Fahr. and maintained until all foaming ceases, the use of this high temperature being desirable although not absolutely necessary. The purpose of the ceresin is to make the mixture non-hygroscopic and also less brittle than it otherwise would be; and the ceresin may be replaced, if desired, by other hydro-carbon waxes, such as paraffin or ozocerite.

The congealing temperature of the product may be regulated by adding free stearic acid thereto. I find that in dealing with temperatures above 290 degrees Fahr. the addition of 1% by weight of stearic acid, effects a drop of about 5 degrees Fahr. in the congealing-point. Obviously this regulation of the congealing-point of the mixture depends upon the special process which is to be followed in making duplicates, and where the congealing temperature is not important no attention whatever need be paid to its regulation, the proportion of ingredients stated being suitable for producing phonograph records according to the process described in Patent No. 683,615 granted October 1, 1901 to Miller and Aylsworth. The material is now strained preferably through open muslin and is ready for use.

(2) In preparing a combination containing montan wax instead of ebonite, the process followed is exactly the same except as to the relative proportions of the ingredients which may be as follows: 100 lbs. of stearic acid, 19 lbs. of montan wax, 19 lbs. of ceresin, 1 lb. of lamp black, to which is added an alkaline solution obtained by dissolving in five gallons of water 22 lbs. of sal-soda, 460 grams of caustic soda and 178 grams of metallic aluminium.

Both ebonite and montan wax may be used in the same composition if desired, in which case the ingredients may be the sums of the quantities set forth in the above formulas; that is to say, 200 lbs. of stearic acid, 41.9 lbs. of ebonite, 19 lbs. of montan wax, 26.377 lbs. of ceresin and 1 lb. of lamp black, to which is added a solution in nine gallons of water, of 44.6 lbs. of sal-soda 934.74 grams of caustic soda and 361.72 grams of metallic aluminium.

Reference is hereby made to the accompanying drawing which shows a phonographic record tablet with the names of the ingredients of formula 1 inscribed thereon.

Having now described my invention, what I claim as new and desire to secure by Letters Patent is as follows:—

1. A composition suitable for the manufacture of phonograph records which contains a wax-like substance extracted from bituminous coal and harder than paraffin, substantially as set forth.

2. A composition suitable for the manufacture of phonograph records which contains the wax-like substance known as ebonite, substantially as set forth.

3. A composition suitable for the manufacture of phonograph records which contains the wax-like substance known as montan wax, substantially as set forth.

4. A composition suitable for the manufacture of phonograph records which contains a metallic soap and a wax-like substance extracted from bituminous coal and harder than paraffin, substantially as set forth.

5. A composition suitable for the manufacture of phonograph records, which contains a metallic soap and the wax-like substance known as ebonite, substantially as set forth.

6. A composition suitable for the manufacture of phonograph records, which contains a metallic soap and the wax-like substance known as montan wax, substantially as set forth.

7. A composition suitable for the manufacture of phonograph records which contains a metallic soap, a hydrocarbon and a wax-like substance extracted from bituminous coal and harder than paraffin, substantially as set forth.

8. A composition suitable for the manufacture of phonograph records, which contains a metallic soap, a hydrocarbon and the wax-like substance known as ebonite, substantially as set forth.

9. A composition suitable for the manufacture of phonograph records, which contains a metallic soap, a hydrocarbon, and the wax-like substance known as montan wax, substantially as set forth.

10. A composition suitable for the manufacture of phonograph records, which contains a metallic soap, a wax-like substance extracted from bituminous coal and harder than paraffin and a black pigment, substantially as set forth.

11. A composition suitable for the manufacture of phonograph records, which contains a metallic soap, a hydrocarbon, a wax-like substance extracted from bituminous coal and harder than paraffin, and a black pigment, substantially as set forth.

This specification signed and witnessed this 2nd day of February 1906.

JONAS W. AYLSWORTH.

Witnesses:
DELOS HOLDEN,
FRANK D. LEWIS.